May 26, 1936. J. LUNDGREN 2,041,771
BALANCING MACHINE
Filed June 30, 1932 2 Sheets-Sheet 2
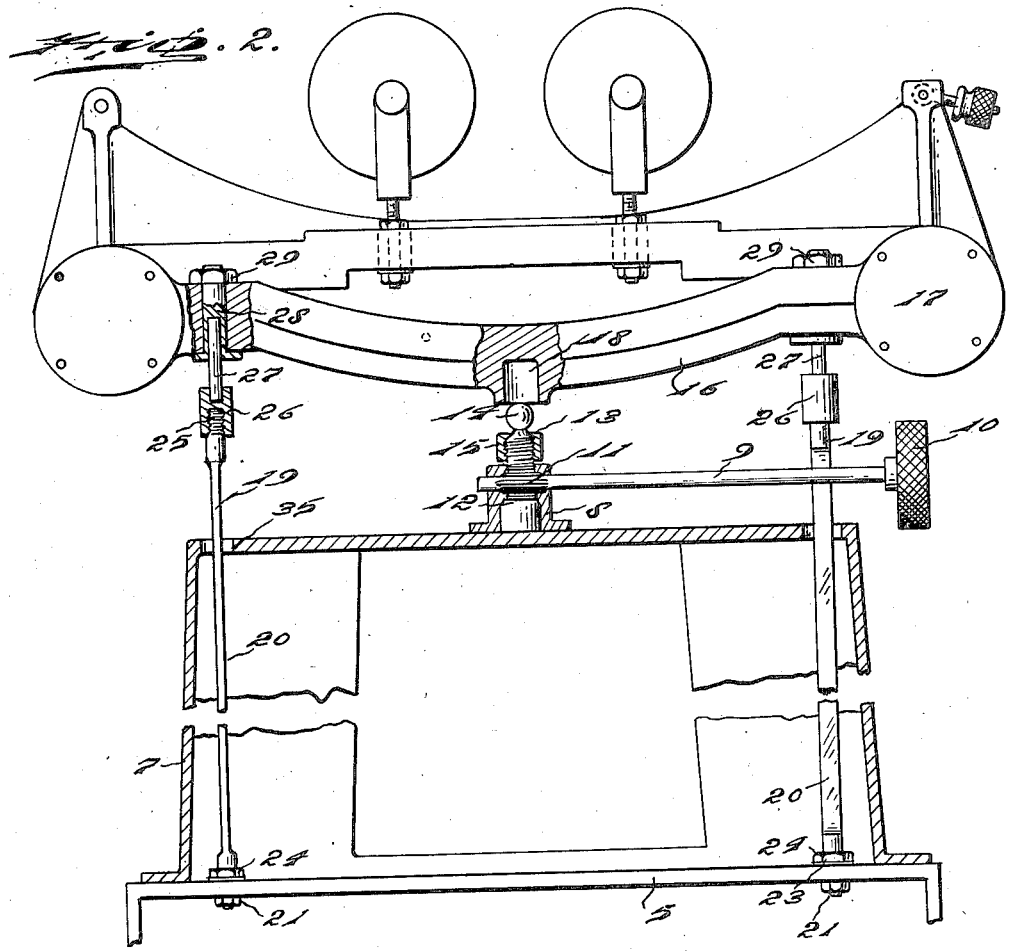
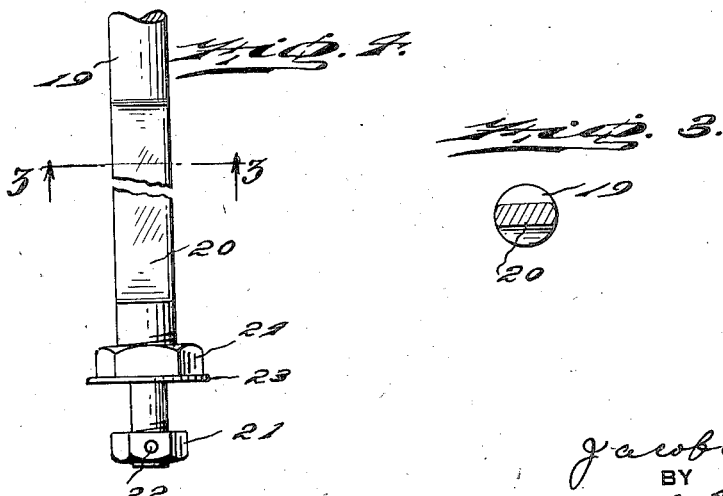
INVENTOR
Jacob Lundgren
BY
Herbert S. Fairbanks
ATTORNEY Patented May 26, 1936

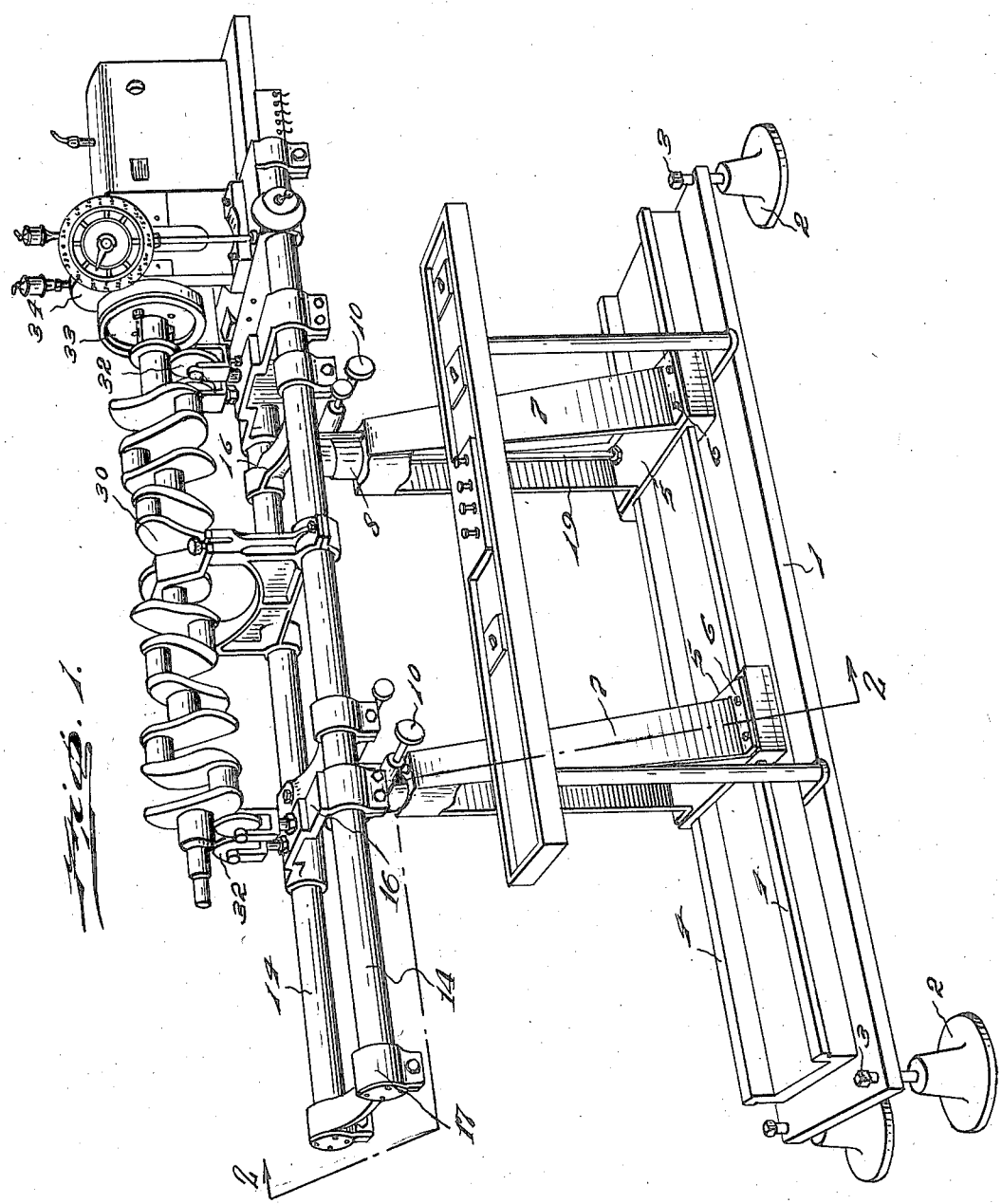

2,041,771

UNITED STATES PATENT OFFICE 2,041,771

BALANCING MACHINE

Jacob Lundgren, Philadelphia, Pa.

Application June 30, 1932, Serial No. 620,258

7 Claims. (Cl. 73—51)

My present invention relates to a balancing machine and more particularly to a novel resilient support or resilient mounting for the vibratory support on which the body to be tested is revolved.

In my co-pending application Serial No. 537,848 filed May 16, 1931, I have described and broadly claimed a balancing machine wherein a vibratory support for the specimen is resiliently mounted on vibration rods having adjustable clamping means in order that the natural vibration period of the springs can be adjusted as may be desired.

In accordance with my present invention I employ spring supports having the same effective length at all times but capable of rotatable adjustment to vary their periods of vibration.

With the above and other objects in view, as will hereinafter more clearly appear, my invention comprehends a novel balancing machine wherein novel resilient mountings are employed connected with the vibratory or oscillating frame and a suitable support.

It further comprehends a novel construction of vibration members and novel means to effect their adjustment to vary their periods of vibration.

Other novel features of construction and advantage will hereinafter clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a perspective view of a balancing machine embodying my invention.

Figure 2 is a sectional view of the balancing machine, the section being taken substantially on line 2—2 of Figure 1.

Figure 3 is a transverse section of one of the vibratory rods, the section being taken on line 3—3 of Figure 4.

Figure 4 is an elevation of a vibratory rod in detached position.

Similar numerals of reference indicate corresponding parts.

Referring to the drawings:

I have preferred to show my novel adjustable resilient mounting for the vibratory support in conjunction with a balancing machine conforming substantially to that shown in my co-pending application Serial No. 537,848.

Since the construction and operation of such type of balancing machine, is clearly set forth in my co-pending application aforesaid, I have deemed it essential in the present case to describe the construction and operation of the balancing machine with only a sufficient clearness to enable those skilled in this art to understand the construction and operation thereof.

The balancing machine is provided with a base or bed 1. The machine can be placed directly on the floor, as free as possible from vibration, or on a cement foundation to which it can be bolted, or it can be provided with support pads 2 which are levelled by set screws 3 provided at the four corners of the base. The base is provided with the front and rear guides 4 which extend longitudinally of the bed and on which the base plates 5 are longitudinally adjustable. The base plates 5 have secured to them by means of the fastening devices 6 the castings or standards 7 which carry at their upper ends the gear cases or sleeves 8 in each of which the shaft 9 is journalled provided with an actuating handle 10. The shaft 9 is provided with a pinion 11 which meshes with a rack 12 on a rod 13 which at its upper end is in the form of a ball shaped pivot member 14 which is flanged at its bottom and secured to the rod 13 by means of a cap nut 15 in threaded engagement with such rod 13. Brackets 16 of a rigid frame 17 which forms a vibratory support for the test body are provided with apertures 18 opening through the bottoms and into which the pivot members 14 may extend. This provides means for forming either a right or left end pivot for the vibratory support.

I provide resilient mountings in the form of spring supports each of which include two vibration rods 19 which intermediate their ends are of reduced thickness as at 20. The lower end of each vibration rod passes through its base plate 5 and at its lower end is threaded to receive a nut 21 which is fixed thereto by means of a pin 22. This nut 21 is located beneath the plate 5. Above the plate 5 I provide a washer 23 which bears against such plate and a locking nut 24 in threaded engagement with its respective vibration rod. The upper end of each vibratory rod is threaded as at 25 to engage the threaded recesses of a union 26 which carries a rod 27 which extends into the aperture in a bolt 28 and fixed to a cross bar 16 by means of a nut 29. The test body, such as, for example, the crank shaft 30, seen in Figure 1, is mounted on antifriction rollers 32 carried by brackets 16 which are longitudinally adjustable on the rods 14 of the vibratory support for the test body. The specimen to be tested is connected by means of a face plate 33 with an electric motor 34 in order to effect the revolution of the test body 30.

As the other parts of the balancing machine are described and broadly claimed in my co-pending application aforesaid, I have deemed it unnecessary to illustrate and describe in detail the other features of the balancing machine.

The castings 7 are apertured as at 35 to provide for the unobstructed vibratory movement of the vibration rods 19. The vibration rods are provided with flats on opposite sides and are capable of being rotatably adjusted for controlling the natural period of oscillation or vibration of the vibratory support 17. By loosening nuts 24 and 29 its respective vibratory rod can be partially rotated and the nuts 24 and 29 are then tightened. Any range of vibratory movement between the adjusted position of a vibratory rod, seen at the left hand of Figure 2, to the adjusted position of a vibratory rod at right angles thereto, as shown at the right hand portion of Figure 2 can be obtained.

The maximum vibratory movement is obtained when the flats of a vibratory rod are substantially parallel with the longitudinal axis of the vibratory support and the minimum vibratory movement is obtained when the flats are substantially at right angles with the longitudinal axis of the vibratory support.

It will thus be clear that by a rotary adjustment of one or more of the vibratory rods, any desired vibratory period can be obtained between the maximum and minimum for which the machine is constructed. This adapts the machine for the testing of bodies of different weights.

For purpose of illustration only I have shown the vibration rods as being reduced in one dimension in cross section, such as, for example, in thickness, by providing flats on opposite faces of a vibration rod. It will, however, be apparent that the shape in cross section is not confined to such construction as it may be oval or have other contour in cross section which will provide changing of the period of vibration by rotatable adjustment of the vibration rod or member.

It will further be apparent that the standard 7 together with the vibration rods and their brackets which carry the anti-friction devices on which the specimen to be tested is revolved are longitudinally adjustable along the bed as a unit of structure.

While it is preferable to have the vibration rods adjustable in order that the test bodies of many different weights can be tested, it will be apparent that if a large number of test bodies of the same character are to be tested the vibration rods may be permanently locked in position and their adjustment will be unnecessary.

I have preferred to illustrate the balancing machine as provided with two pairs of vibration rods but it is to be understood that two or more may be employed, for example, two vibration rods may be provided at one end and one at the other if desired.

It will now be apparent that I have devised a new and useful balancing machine which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a balancing machine, a vibratory support for a revoluble test body means to provide a fixed pivot of vibration for said vibratory support, and a resilient mounting for said vibratory support capable of being rotatably adjusted to vary the period of vibration of said vibratory support without affecting the pivot of vibration.

2. In a balancing machine, a vibratory support for a revoluble test body means to provide a fixed right or left end pivot of vibration, and rotatably adjustable vibration rods forming a resilient mounting for said vibratory support said vibration rods being rotatable to vary the period of vibration without affecting the pivot of vibration.

3. In a balancing machine, a vibratory support for a revoluble test body means to provide an adjustable fixed pivot for said body, a bed, rotatably adjustable vibration rods of increased resiliency intermediate their ends forming a resilient mounting for said vibratory support and adjustable to vary the period without affecting the pivot of vibration, means to longitudinally adjust said pivots and support as a unit relatively to said bed, and means to lock said rods in the positions to which they have been adjusted.

4. In a balancing machine, a vibratory support for a revoluble test body, means separate from said support to lock said support to provide either a left or right pivot for its vibration, and a resilient mounting for said vibratory support capable of being rotatably adjusted to vary the period of vibration of said vibratory support and of decreased diameter at its points of connection with said vibratory support.

5. In a balancing machine, a vibratory support for a revoluble test body, vibration members on opposite sides of the longitudinal axis of said support forming a resilient mounting for it, said members being capable of rotatable adjustment and of reduced diameter at their upper ends, and means to lock said members in their adjusted positions.

6. In a balancing machine, vibratory supports for the specimen, means to lock said supports to provide either a left or right end pivot for the vibrations of said vibratory support, vibration rods forming a resilient mounting for said vibratory supports, said rods being of reduced thickness intermediate their ends and having rods connecting them with the vibratory support, and being capable of rotatable adjustment, and means to lock said rods in their adjusted positions.

7. In a balancing machine, the combination of a base, vertical guides on said base, slidable pivot carriers mounted in said guides, pivot members on the upper ends of said carriers, a work-supporting frame, members on said frame formed with socketed portions adapted to be entered by said pivot members, means for rotatably mounting a body to be tested on said frame, and means for actuating said carriers whereby to move said pivot members into and out of engagement with said socketed portions.

JACOB LUNDGREN.